United States Patent
Christner et al.

(10) Patent No.: US 9,353,664 B2
(45) Date of Patent: May 31, 2016

(54) METHOD FOR OPERATING AN EXHAUST GAS TREATMENT SYSTEM HAVING AN SCR CATALYTIC CONVERTER

(75) Inventors: Bernd Christner, Huelben (DE); Uwe Hofmann, Reichelsheim (DE); Alexander Kaiser, Fellbach (DE); Markus Paule, Korb (DE)

(73) Assignee: Daimler AG, Stuttgart (DE)

( * ) Notice: Subject to any disclaimer, the term of this patent is extended or adjusted under 35 U.S.C. 154(b) by 1198 days.

(21) Appl. No.: 12/992,787

(22) PCT Filed: Jul. 22, 2009

(86) PCT No.: PCT/EP2009/005305
§ 371 (c)(1),
(2), (4) Date: Jan. 5, 2011

(87) PCT Pub. No.: WO2010/015327
PCT Pub. Date: Feb. 11, 2010

(65) Prior Publication Data
US 2011/0113752 A1 May 19, 2011

(30) Foreign Application Priority Data

Aug. 7, 2008 (DE) .................. 10 2008 036 884

(51) Int. Cl.
*F01N 3/035* (2006.01)
*F01N 3/20* (2006.01)
*F01N 9/00* (2006.01)

(52) U.S. Cl.
CPC ............. *F01N 3/208* (2013.01); *F01N 9/005* (2013.01); *F01N 3/035* (2013.01);
(Continued)

(58) Field of Classification Search
CPC ............. F01N 2900/0402; F01N 2900/0421; F01N 2900/00; F01N 2900/04; F01N 2560/021; F01N 2900/1622; Y02T 10/24
USPC ............ 60/274, 286, 295, 301, 303; 701/102, 701/103, 109; 123/672, 698, 703, 704; 73/114.69, 114.71, 114.72, 114.75
See application file for complete search history.

(56) References Cited

U.S. PATENT DOCUMENTS 5,865,026 A * 2/1999 Davey et al. .................... 60/274
6,004,524 A 12/1999 Morsbach et al.
(Continued)

FOREIGN PATENT DOCUMENTS

DE 101 00 420 A1 7/2002
DE FR 2852627 A1 * 9/2004 ............ F01N 3/0842
(Continued)

OTHER PUBLICATIONS

Hogenson, Jim. PID for Dummies, Control Solutions, Inc. <http://www.csimn.com/CSI_pages/PIDforDummies.html>. Date Accessed: Oct. 30, 2014.*
(Continued)

*Primary Examiner* — Hung Q Nguyen
*Assistant Examiner* — Josh Campbell
(74) *Attorney, Agent, or Firm* — Crowell & Moring LLP

(57) ABSTRACT

In a system with an SCR catalytic converter, a correction by a changeable long term adaption factor to a target dosing rate is provided for the model dosing rate and a correction by a changeable short term adaption factor to an assumed actual filling state for the ammonia filling level value. A dosing unit controllable by a control unit adds an ammonia-containing reducing agent to the exhaust gas and an exhaust gas enriched with ammonia according to the dosing is fed to the SCR catalytic converter. An ammonia filling level value for a filling level of ammonia stored in the SCR catalytic converter and a model dosing rate for dosing the reducing agent into the exhaust gas are calculated by a computer model.

19 Claims, 3 Drawing Sheets

Figure 1:
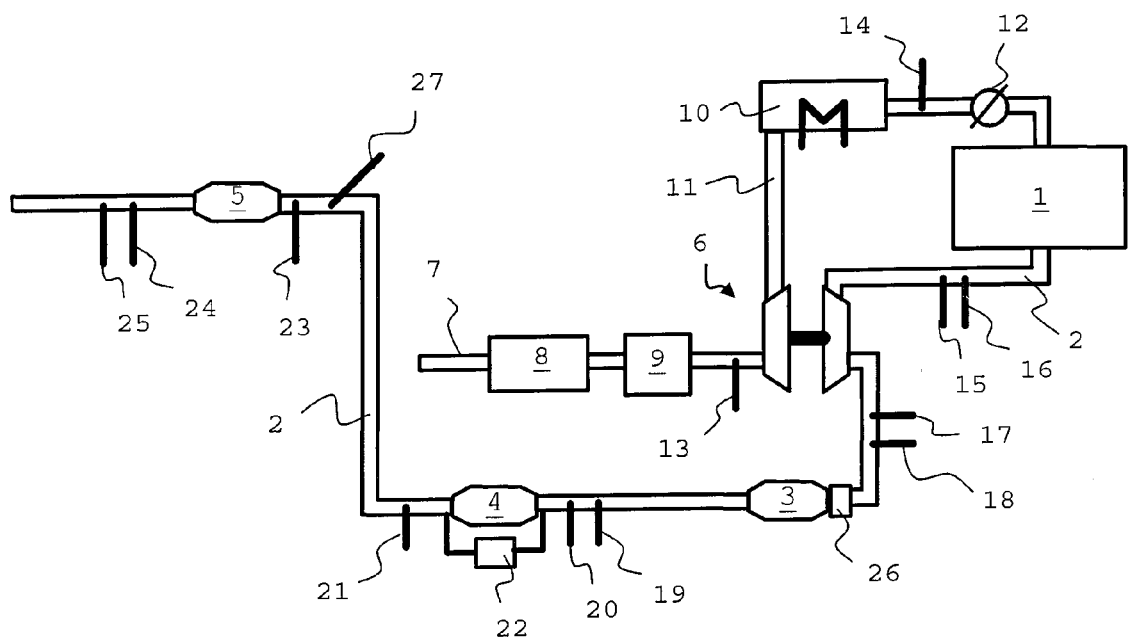

(52) U.S. Cl.
CPC .... *F01N 2560/021* (2013.01); *F01N 2560/025* (2013.01); *F01N 2560/06* (2013.01); *F01N 2560/08* (2013.01); *F01N 2560/14* (2013.01); *F01N 2570/10* (2013.01); *F01N 2570/14* (2013.01); *F01N 2610/02* (2013.01); *F01N 2900/0402* (2013.01); *F01N 2900/0421* (2013.01); *F01N 2900/1621* (2013.01); *F01N 2900/1622* (2013.01); *Y02T 10/24* (2013.01); *Y02T 10/47* (2013.01)

(56) References Cited

U.S. PATENT DOCUMENTS

| | | | | |
|---|---|---|---|---|
| 6,151,888 | A * | 11/2000 | Schneider et al. | 60/274 |
| 6,993,900 | B2 * | 2/2006 | Upadhyay et al. | 60/274 |
| 2004/0055284 | A1 * | 3/2004 | Ripper et al. | 60/286 |
| 2004/0211171 | A1 * | 10/2004 | Nakagawa | F02D 41/0275 60/285 |
| 2005/0282285 | A1 * | 12/2005 | Radhamohan et al. | 436/55 |
| 2006/0000202 | A1 * | 1/2006 | Ripper et al. | 60/286 |
| 2006/0096278 | A1 * | 5/2006 | Lueders et al. | 60/286 |
| 2007/0056267 | A1 * | 3/2007 | Handler et al. | 60/286 |
| 2007/0068142 | A1 * | 3/2007 | Robel et al. | 60/285 |
| 2008/0216463 | A1 * | 9/2008 | Chaineux et al. | 60/274 |
| 2009/0199541 | A1 * | 8/2009 | Walz et al. | 60/276 |

FOREIGN PATENT DOCUMENTS

| | | | | |
|---|---|---|---|---|
| DE | 10 2005 042 490 | A1 | 3/2007 | |
| DE | 102005042489 | A1 * | 3/2007 | F01N 3/208 |
| DE | 10 2006 041 676 | A1 | 3/2008 | |
| DE | 102006041676 | A1 * | 3/2008 | |
| EP | 0 554 766 | A1 | 8/1993 | |
| EP | 1 348 477 | A1 | 10/2003 | |
| WO | WO 2006097268 | A1 * | 9/2006 | |

OTHER PUBLICATIONS

Translation of DE102006041676 A1.*
International Search Report including partial English translation dated Oct. 23, 2009 and PCT/ISA/237 Form (Fourteen (14) pages).

* cited by examiner

METHOD FOR OPERATING AN EXHAUST GAS TREATMENT SYSTEM HAVING AN SCR CATALYTIC CONVERTER

CROSS-REFERENCE TO RELATED APPLICATIONS

This application is a national stage application of PCT International Application No. PCT/EP2009/005305, filed Jul. 22, 2009, and claims priority under 35 U.S.C. §119 to German Patent Application No. 10 2008 036 884.9, filed Aug. 7, 2008, the entire disclosures of these documents are herein expressly incorporated by reference.

BACKGROUND AND SUMMARY OF THE INVENTION

The present invention relates to a method for operating an exhaust gas treatment system, comprising an SCR catalytic converter for treatment an exhaust gas of a motor vehicle internal combustion engine, wherein a reducing agent containing ammonia is fed to the exhaust gas and an exhaust gas enriched with $NH_3$ corresponding to the dosing is fed to the SCR catalytic converter, and an ammonia filling level value for a filling state of ammonia stored in the SCR catalytic converter is calculated by a computer model.

For the catalytically supported removal of nitrogen oxides (NOx) from internal combustion engine exhaust gases, it is known to add aqueous urea solution as a reducing agent containing ammonia ($NH_3$) to the exhaust gas. In the hot exhaust gas, $NH_3$ is released as the actual selective reducing agent with regard to the NOx reduction at a so-called SCR catalytic converter by means of thermolysis and/or hydrolysis. Thus, one problem is determining an appropriate feed rate for the reducing agent while avoiding an overdosing which can result in an undesired slip of $NH_3$.

For solving these problems, EP 1 348 477 A1 discloses determining a usage rate of $NH_3$ stored in the catalytic converter and a NOx treatment rate and to control the reducing agent feed in dependence on these variables in connection with a filling level of $NH_3$ stored in the catalytic converter.

Published application EP 0 554 766 A1 discloses a method for the NOx reduction in exhaust gases by controlled hyperstoichiometric addition of $NH_3$, wherein $NH_3$ is dosed upstream of a catalytic converter until the $NH_3$ amount stored in the catalytic converter has reached an upper threshold value. The $NH_3$ stored in the catalytic converter is used with the NOx emitted by the internal combustion engine and fed to the catalytic converter, whereby the toxic substance NOX is removed from the exhaust gas. The $NH_3$ feed is again carried on when the $NH_3$ amount stored in the catalytic converter has reached a lower threshold.

In these and other known similar methods, a model-based combination of measurement values and stored characteristic values often takes place, for example for the SCR catalytic converter. A $NH_3$ feed rate and a modeled usage rate are balanced by an integration continuously carried out and the reducing agent dosing rate is chosen in such a manner that a desired $NH_3$ filling level in the catalytic converter and a catalytic converter efficiency. It has, however, been shown that errors caused by, for example, parameter changes add up in the course of time, so that the correspondence between the modeled $NH_3$ filling level of the catalytic converter and the actual value worsens and dosing errors result in the form of an underdosing or overdosing. The result of this is a reduced treatment effect or an increased $NH_3$ slip. As a solution for this problem, it is suggested in DE 101 00 420 A1, which adapts the dosing rate in that at least one relevant measuring variable is sensed with certain operating states and is adapted to an expected value by correction. It has however been shown that further improvements are necessary to be able to meet requirements for the highest nitrogen oxide conversions.

Accordingly, exemplary embodiments of the present invention provide a method for operating an exhaust gas treatment system with an SCR catalytic converter, which enables a nitrogen conversion that is improved further.

An exemplary method for operating an exhaust gas treatment system, comprising an SCR catalytic converter for the treatment of an exhaust gas of a motor vehicle internal combustion engine is provided. The method involves adding, by a dosing unit controllable by a control unit, an ammonia-containing reducing agent to the exhaust gas; feeding an exhaust gas enriched with ammonia according to the dosing to the SCR catalytic converter; calculating, by a computer model, an ammonia filling level value for a filling state of ammonia stored in the SCR catalytic converter; and calculating, by the computer model, a model dosing rate for the dosing of the reducing agent into the exhaust gas at which a target filling level of ammonia stored in the SCR catalytic converter specified by the computer model or a target efficiency specified by the computer model for a nitrogen oxide conversion with ammonia stored in the SCR catalytic converter or fed to the SCR catalytic converter are at least approximately achieved. A correction by a changeable long term adaption factor to a target dosing rate is provided for the model dosing rate, a correction by a changeable short term adaption factor to an assumed actual filling level is provided for the ammonia filling level value, the dosing unit is accessed for emitting the target dosing rate, integrations in successive integration cycles of a presettable length respectively determine a nitrogen raw emission value, a nitrogen pure emission estimated value and a nitrogen pure emission measuring value and further a difference of the nitrogen pure emission measuring value and the nitrogen pure emission estimated value related to the nitrogen oxide raw emission value as the adaption characteristic value, and the adaption characteristic value is used for assessment of a long term or short term adaption.

With the method according to the invention, a $NH_3$ filling level value for a filling level of ammonia stored in the SCR catalytic converter is calculated and a model dosing rate for the dosing of the reducing agent into the exhaust gas is calculated by the computer model, with which a target filling level of $NH_3$ stored in the SCR catalytic converter predetermined by the computer model or a predetermined target efficiency for a NOx conversion with $NH_3$ stored in the SCR catalytic converter and/or fed to the catalytic converter shall be reached at least approximately. In a further arrangement of the invention, a correction to a target dosing rate by a changeable long term adaption factor is provided for the model dosing rate with the active filling level regulation and/or with an active efficiency control and in a The dosing unit is correspondingly accessed for emitting the target dosing rate.

Thus, the present invention provides the ability to perform a correction acting directly on the model dosing rate, which will become immediately effective, but is possibly maintained over a longer time. On the other hand, the possibility is provided to perform a correction of the modeled $NH_3$ filling level acting in the short term. In this manner, compensation can be performed for disturbing influences occurring in the short term and disturbing influences effective over a longer time, such as gradually progressing ageing or drift effects.

In an arrangement of the invention NOx and/or $NH_3$ emission values of the exhaust gas are determined continuously and the NOx and/or $NH_3$ emission values are evaluated in a cyclic manner by the control unit with regard to fulfilling a predetermined short term adaption criterion and/or a long term adaption criterion. With this advantageous arrangement, a plausibility check of the modeled $NH_3$ filling level value takes place in successive cycles by adjustment with emission values. The emission values can be determined in a measurement-technical manner or be taken from operating characteristic fields. A modeled $NH_3$ filling level value, possibly corrected subsequent to a cycle to the assumed actual filling level, then serves as the current filling level value, on which a further balancing integration and dosing sits in order to achieve the target filling level or the target efficiency. This is synonymous with a short term adaption of the $NH_3$ filling level value, with which is reacted promptly to short term influences, which possibly lead to a false modeling of the $NH_3$ filling level. However, a correction of the model dosing rate possibly performed particularly by multiplication with the long term adaption factor has an effect beyond a cycle, which is synonymous with a long term adaption. By the procedure according to the invention with a cyclically performed check of modeled operating variables, a cyclic adaptation of these operating variables is enabled, if this is necessary. This ensures a highly exact modeling, and an optimal $NH_3$ filling level adjustment and optimal catalytic converter efficiency are achieved.

In a further arrangement of the invention, by integration in successive integration cycles of a presettable length, respectively a NOx raw emission value, a NOx pure emission estimated value and a NOx pure emission measuring value and further a difference of the NOx pure emission measuring value and the NOx pure emission estimated value related to the NOx raw emission value as the adaption characteristic value (K) are respectively determined in parallel.

The NOx raw emission value is preferably determined by integration of an NOx content in the exhaust gas on the input side of the SCR catalytic converter. The NOx content can be obtained on the input side of the SCR catalytic converter in a measure-technical manner by a correspondingly arranged NOx sensor or in a model-based manner. The NOx raw emission value represents a NOx amount flowing into the SCR catalytic converter in a respective integration cycle and thus the NOx load of the SCR catalytic converter.

The estimated NOx raw emission value can be determined by integration of an NOx content in the exhaust gas on the output side of the SCR catalytic converter calculated by the computer model. The computer model estimates the NOx conversion rate of the catalytic converter using present operating variables such as model dosing rate, actual filling level, catalytic converter temperature, exhaust gas mass flow and possibly further variables. By integration over an integration cycle, an NOx amount as NOx pure emission estimate value leaving the SCR catalytic converter in the integration cycle results together with the NOx amount flowing into the SCR catalytic converter.

The NOx raw emission measuring value can be determined by integration of an NOx content in the exhaust gas on the output side of the SCR catalytic converter derived from a signal of a NOx sensor arranged on the output side of the SCR catalytic converter.

By forming the difference of the NOx pure emission estimated value and the NOx pure emission measuring value, deviations of the modeled NOx pure emission are sensed from the measured pure emission. The adaption characteristic value thereby forms a very informative characteristic value with regard to the modeling quality of the computer model as the difference referred to the NOx raw emission value.

The adaption characteristic value is consulted according to the invention as the decisive characteristic value for the assessment of the necessity of a long term and/or short term adaption. In particular, the long term criterion is viewed as fulfilled in a further arrangement of the invention, if the adaption characteristic value exceeds a presettable threshold and in a still further arrangement of the invention the short term adaption criterion is viewed as fulfilled if the adaption characteristic value falls below a presettable lower threshold.

In a further arrangement of the invention, the long term adaption factor is changed by a presettable amount with a fulfilled long term criterion and the short term adaption factor is changed by a presettable amount with a fulfilled short term adaption criterion. The amount by which the long term or the short term is possibly changed, can be provided in a fixed manner or be preset depending on the magnitude of the adaption characteristic value. In the later case, it can be corrected in a correspondingly high manner analogously to a proportional regulation with comparatively high error modelings, whereby an approach to the target variables is enabled in a correspondingly fast manner.

In a further arrangement, a current filling capacity for a $NH_3$ amount that can currently maximally be stored in the SCR catalytic converter and a currently maximally possible efficiency for a NOx conversion of the SCR catalytic converter are determined, and, when falling below a presettable threshold for the current filling capacity, are preset as the target efficiency. For example, with a high catalytic converter temperature, the filling capacity of the SCR catalytic converter can be so low that the adjustment of the target filling level is difficult. Using the procedure according to the invention, an exact modeling is also enabled in these cases, as the target dosing rate of the reducing agent is then adjusted with a view to the target efficiency of the catalytic converter. According to the invention, an adaption is also provided with this operating manner. For this, a long term adaption factor is fixed in such a manner in a further arrangement of the invention that the resulting NOx raw emission estimated value would have led to an adaption characteristic value of zero or approximately zero in the previous integration cycle.

Advantageous embodiments of the invention are illustrated in the drawings and are described in the following. The previously mentioned characteristics and which will still be explained in the following cannot only be used in the respectively given combination but also in other combinations or on their own without leaving the scope of the present invention.

BRIEF DESCRIPTION OF THE DRAWING FIGURES

Figure 2:
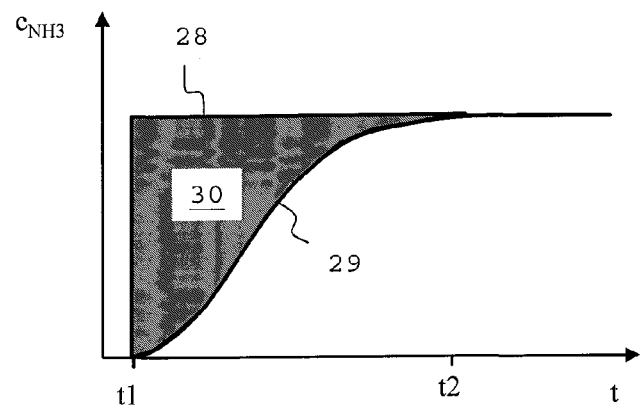
Figure 3:
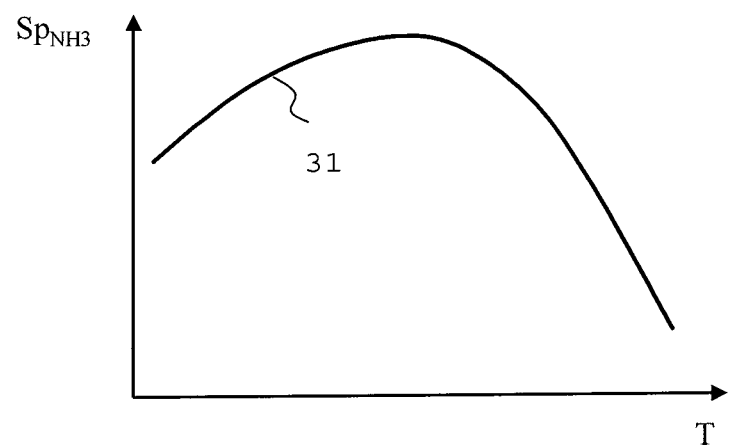
Figure 4:
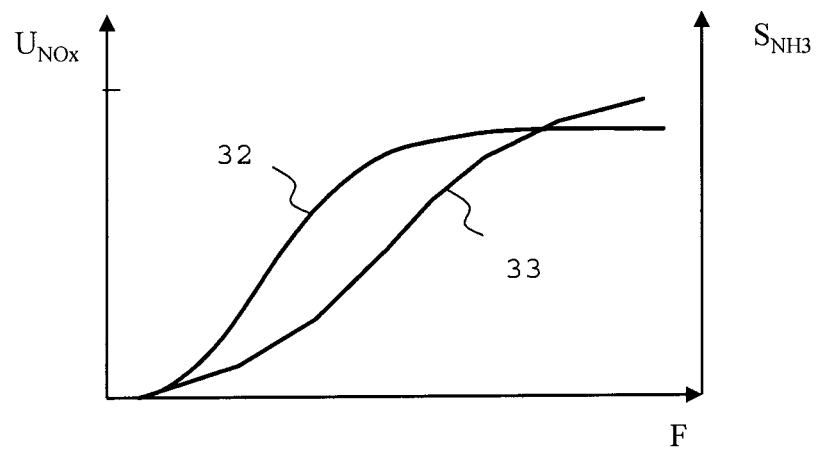
Figure 5:
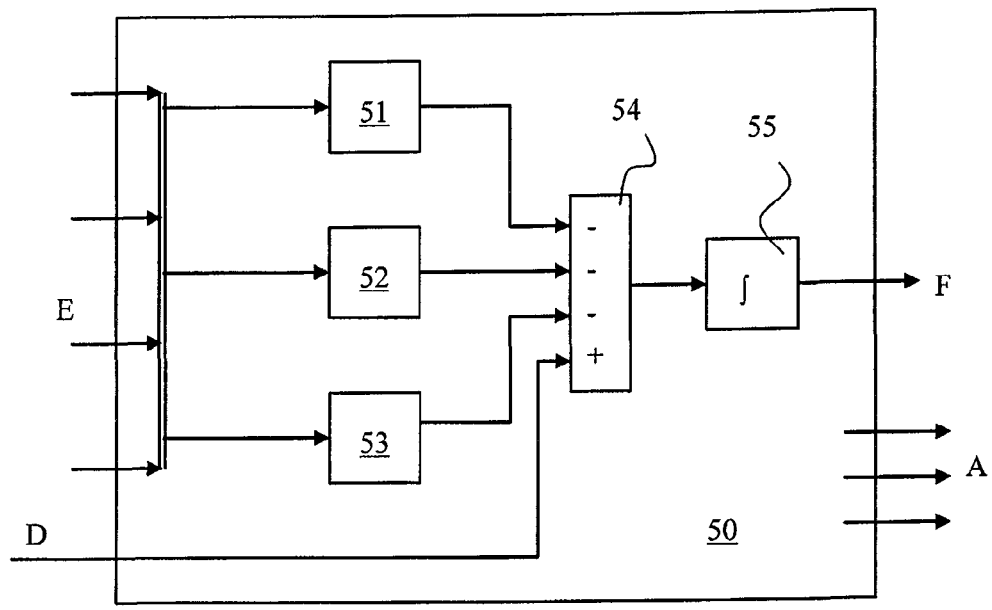
Figure 6:
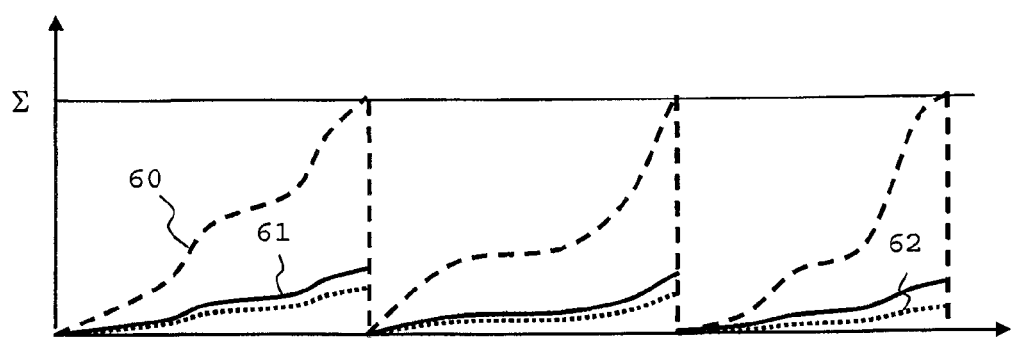

It shows thereby:

FIG. 1 is a schematic block diagram of a motor vehicle internal combustion engine with a connected exhaust gas treatment system, FIG. 2 is a diagram for the clarification of the $NH_3$ storage capacity of an SCR catalytic converter, FIG. 3 is a diagram for the clarification of the temperature dependence of the $NH_3$ storage capacity, FIG. 4 is a diagram for the clarification of the dependence of nitrogen oxide conversion and $NH_3$ slip from the $NH_3$ filling level of an SCR catalytic converter, FIG. 5 is a schematic block diagram depiction for the clarification of a preferred procedure for determining the $NH_3$ filling level of the SCR catalytic converter of the exhaust gas treatment system, and FIG. 6 is a diagram with exemplary time courses of integrated emission values which are consulted for determining an adaption characteristic value.

DETAILED DESCRIPTION OF THE DRAWING FIGURES

FIG. 1 shows a schematic block diagram of an exemplary internal combustion 1 engine of a motor vehicle (not shown) with an associated exhaust gas treatment system. The internal combustion engine 1 can be an air-compressing internal combustion engine, in the following simply called diesel engine. The exhaust gas ejected from the diesel engine 1 is received by an exhaust gas line 2 and successively flows through an oxidation catalytic converter 3, a particle filter 4 and a NOx reducing catalytic converter 5. The oxidation catalytic converter 3 and the particle filter 4 can also be arranged in a common housing close to each other. The particle filter 4 can be provided with a catalytic coating which promotes soot combustion and/or NO oxidation.

For heating the oxidation catalytic converter 3 or of the exhaust gas, a heating device 26 can be arranged in the exhaust gas line 2 on the inlet side of the oxidation catalytic converter 3 as shown. The heating device 26 can be formed as an electrical heating element or also as a reformer supplying heat or pre-combustor. A heating of the exhaust gas is particularly considered with a regeneration of the particle filter 4 by soot combustion. For the determination of the necessity of such regeneration, a differential pressure sensor 22 is associated with the particle filter 4, which delivers a signal that can be evaluated. Furthermore, an exhaust gas turbocharger 6 is provided, whose turbine is driven by the exhaust gas flow and whose compressor feeds air taken in via an intake air line 7 to the diesel engine 1 via an air feed line 11. The exhaust gas turbocharger 6 is preferably formed as a so-called VTG charger with a variable adjustment of its turbine blades.

A throttle flap 12 is arranged in the air feed line 11 for the adjustment of the air amount fed to the diesel engine. An air filter 8 or an air mass meter 9 is arranged in the intake air line 7 for treatment of the intake air or for measuring the intake air amount. A charge-air cooler 10 arranged in the air feed line cools the compressed intake air. Furthermore, an exhaust gas return, not shown, that can be adjusted via an exhaust gas return valve is provided, with which a predetermined amount of returned exhaust gas of the intake air can be fed.

An addition point with a dosing unit 27 is arranged upstream of the NOx reduction catalytic converter 5 for adding a reducing agent to the exhaust gas. The supply of the dosing unit 27 with the reducing agent takes place from a container (not illustrated). In the following it is assumed that the reducing agent is an aqueous urea solution that is fed to the exhaust gas via the dosing unit 27 in a dosed manner. $NH_3$ is released in the hot exhaust gas by thermolysis and or hydrolysis, which $NH_3$ acts selectively with regard to the reduction of NOx contained in the exhaust gas. The NOx reduction catalytic converter 5 is accordingly formed as a classical SCR catalytic converter based on $V_2O_5/WO_3$ or as a supported SCR catalytic converter coated with zeolite. The method according to the invention can, however, also be used advantageously for dosing other reducing agents in a free or bound form. Particularly when using aqueous urea solution as reducing agent, a mixing unit (not shown) can be arranged in the exhaust gas line between the dosing unit 27 and the NOx reduction catalytic converter 5, with which mixing unit reducing agent which has preferably already been sprayed by the dosing unit into the exhaust gas in a finely distributed manner is mixed with exhaust gas to a mixture that is as homogeneous as possible. A droplet evaporation and the release of $NH_3$ can thereby be promoted.

For controlling the operation of the exhaust gas treatment system and of the diesel engine 1, a control unit (not shown) is provided, which obtains information regarding operating state variables of the diesel engine 1 and of the exhaust gas treatment system. Information regarding engine operating variables can, for example, relate to an emitted torque or a speed. The control unit can include a computing unit and a storage unit and an input-output unit. The control unit is capable of complex signal processing procedures and sensing the operation of the diesel engine 1 and of the exhaust gas treatment system and to control or regulate it. Characteristic fields necessary for this are preferably deposited in the storage device, wherein an adaptive adaptation of the characteristic fields can also be provided. The characteristic fields are mainly related to the important state variables of the exhaust gas, such as mass flow, raw emission, temperature in dependence on the operating state variables of the diesel engine such as load, speed, air ratio number etc. Furthermore, characteristic fields for the important state variables of the oxidation catalytic converter 3, of the particle filter 4 and of the SCR catalytic converter 5 are provided. Regarding the SCR catalytic converter 5, these characteristic fields in particular relate to the NOx conversion or the efficiency with regard to the nitrogen oxide conversion and the $NH_3$ storage capacity depending on influence variables decisive for this.

The sensing of operating states of the diesel engine 1 and of the exhaust gas treatment system and the associated units preferably takes place at least partially using suitable sensors. For example, in FIG. 1 are depicted pressure sensors 13 and 15 for a pressure in front of the compressor and a pressure in front of the turbine of the turbocharger and temperature sensors 14, 16, 18, 19, 21, 23 and 24 for respectively a temperature after the charge-air cooler 10, in front of the turbine, in front of the oxidation catalytic converter 3, in front and behind the particle filter 4 and in front of and behind the SCR catalytic converter 5. Further sensors, particularly for sensing exhaust gas components, can also be provided. A lambda sensor 17 and sensors 20 and 25 are provided for the nitrogen oxide and/or $NH_3$ content in the exhaust gas. The signals of the sensors are processed by the control unit, so that the essential state variables are always present and the operating point of the diesel engine can be changed in such a manner, if necessary, to achieve an optimal or desired operation of the exhaust gas treatment system.

In the following, different characteristic variables of a typical SCR catalytic converter 5 used in the exhaust gas treatment system of the diesel engine 1 are explained with regard to FIGS. 2 to 4. FIG. 2 shows a diagram for explaining the $NH_3$ filling capacity.

The diagram of FIG. 2 represents a typical temporal course $c_{NH3}(t)$ of $NH_3$ concentrations $c_{NH3}$ with an application of the SCR catalytic converter 5 with $NH_3$. It is thereby assumed that an SCR catalytic converter 5 free from stored $NH_3$ is applied with an exhaust gas input flow of a predetermined and temporally constant variable and an $NH_3$ input concentration under isothermal conditions from the time t1, which is given by the trace 28. In correspondence with its $NH_3$ storage capacity, the SCR catalytic converter 5 receives $NH_3$ in a temporally decreasing measure in the period between t1 and t2. Corresponding to this, the $NH_3$ concentration in the exhaust gas flow leaving the SCR catalytic converter 5 remains behind the input concentration which is reproduced by the trace 29. The SCR catalytic converter is saturated at the time t2, which is why it cannot store any further $NH_3$, and the trace 29 opens into the trace 28. The $NH_3$ filling level has then reached its maximum value. The $NH_3$ amount thereby stored by the SCR catalytic converter 5, which represents the $NH_3$ filling capacity or $NH_3$ storage ability under the corresponding conditions, is represented by the magnitude of the surface 30 between the two traces 28, 29.

The $NH_3$ filling capacity is predominantly dependent on the temperature, as is depicted by the diagram shown in FIG. 3. The trace 31 represents a typical course of the temperature-dependent $NH_3$ filling capacity $Sp_{NH3}$ (T). The $NH_3$ filling capacity $Sp_{NH3}$ (T), as can be seen in the diagram of FIG. 3, is comparatively large with low temperatures T and decreases at high temperatures T, about 300° C. In addition a dependence on the gas flow rate exists, which is not shown in detail.

The $NH_3$ filling level of the SCR catalytic converter 5 can be given absolutely as a stored $NH_3$ amount or as a fraction of the $NH_3$ amount that can maximally be stored under the respective conditions, that is, the $NH_3$ filling capacity $SpNH_3$.

An important aspect in connection with the properties of the SCR catalytic converter 5 relates to the dependence of the NOx conversion from the $NH_3$ filling level. In FIG. 4, this dependence is shown by the trace 32. Compared to this, the dependence of the $NH_3$ slip $S_{NH3}$ on the $NH_3$ filling level is reproduced by the trace 33. The NOx conversion $U_{NOx}$(F) thereby increases continuously with an incline becoming flatter up to a maximum value with an increasing $NH_3$ filling level F, which maximum value is essentially determined by the gas flow rate and by the temperature. This means that, from a certain value for the NH3 filling level F, the NOx conversion $U_{NOx}$ cannot be increased further by a further storing of $NH_3$ in the catalytic converter. Rather, the $NH_3$ slip $S_{NH3}$ increases, as represented by the trace 33. With the adjustment of an optimal value for the $NH_3$ filling level F for the respective conditions, the consideration of these facts is important.

The dependencies shown schematically in FIGS. 2 to 4 are conveniently determined in advanced for the particular SCR catalytic converter 5 and are deposited as characteristic lines or characteristic fields. The control unit can access these, so that the state of the SCR catalytic converter 5 can be determined for comprising each operating state.

The present invention fixes the dosing rate for the urea solution in such a manner that an NOx conversion that is as high as possible, but at least corresponding to the requirements, is enabled through the SCR catalytic converter 5. According to the invention, an adaption of a model dosing rate determined by a corresponding model dosing rate and of a $NH_3$ filling level of the SCR catalytic converter 5 is provided. The computer model can be stored as a program in the control unit. In the following, various components of the computer model are described.

One component of the computer model is a filling level calculation block 50, schematically shown in FIG. 5, for determining the $NH_3$ filling level of the SCR catalytic converter 5. Different input variables E are fed to the calculation block 50, which variables relate to exhaust gas state variables, such as the exhaust gas temperature, exhaust gas mass flow and the NOx content of the exhaust gas flowing into the SCR catalytic converter 5. The latter can be determined in a measurement-technical manner or using deposited engine operating characteristic fields. The input variables E can possibly comprise further variables.

The filling level calculation block 50 can access characteristic field sets designated in an exemplary manner with 51, 52, 53 in FIG. 5, particularly regarding a $NH_3$ loss or usage of $NH_3$ stored in the SCR catalytic converter 5 and or fed thereto. These characteristic field sets 51, 52, 53 relate to, for example, the NOx conversion $U_{NOx}$, a direct conversion with oxygen and a desorption rate. A consideration of reducing agent losses by wall deposition in the exhaust gas line 2, incomplete conditioning and the like can be provided. The decisive rates are thereby determined corresponding to the present input variables E. The values regarding the $NH_3$ loss are fed together with a model dosing rate D to a summation section 54, which sums up the respective variables with the correct prefix. This enables a balancing for the variables which essentially determines the $NH_3$ amount stored in the SCR catalytic converter. The sum value determined by the summation section 54 is fed to an integration section 55, whose output magnitude is a $NH_3$ filling level value F, which represents the current NH3 filling level of the SCR catalytic converter 5. In addition, further output data are determined from the present data. These are, for example, modeled values for the NOx content of the exhaust gas flowing from the SCR catalytic converter 5 and the $NH_3$ slip $S_{NH3}$.

The computer model comprises an efficiency calculation block as a further calculation block, which determines a target efficiency η for an NOx-conversion $U_{NOx}$ with $NH_3$ stored in the SCR catalytic converter 5 and or fed thereto depending on one or several of the input variables E and/or output variables A. In the efficiency calculation block, an influence of a passivation of the SCR catalytic converter 5 that is possibly present can be considered. Such a passivation can particularly be caused by hydrocarbons (HC) fed through the SCR catalytic converter 5 and adsorbed on catalytically active centers. For consideration of a passivation by adsorbed hydrocarbons, an engine characteristic field regarding a HC emission of the diesel engine 1, a characteristic field regarding a HC conversion of the oxidation catalytic converter 3 and/or particle filters 4 and HC adsorption and desorption characteristic lines of the SCR catalytic converter 5 can be reverted to.

The model dosing rate D is calculated from the determined $NH_3$ filling level F, the target filling level and or the target efficiency. If a difference of the determined $NH_3$ filling level value F and the target filling level are returned in a type of feedback control for calculating the model dosing rate D, a model-based $NH_3$ filling level regulation is performed. A band for the target filling level can be specified, which band is defined by a respectively lower and upper threshold. The thresholds or the target filling level can be specified in such a manner that an associated presettable NOx conversion and/or an associated presettable $NH_3$ slip $S_{NH3}$ result.

Even though a high NOx conversion $U_{NOX}$ of the SCR catalytic converter 5 that is desired can be achieved in a largely reliable manner, a measurement-technical control of the pure emission present behind the SCR catalytic converter 5 is advantageous and provided according to the invention. If, for example, undesired deviations from the desired modeled result are determined, the computer model or its input variables are acted upon in a correcting manner. Particularly with corresponding deviations, an adaptive correction of the model dosing rate and/or of the $NH_3$ filling level value F is provided. A measure-technical determination of the $NH_3$ emission and of the $NO_x$ emission on the output side of the SCR catalytic converter 5 can be provided with separate exhaust gas sensors 25, which are respectively sensitive to $NH_3$ or NOx.

If a value for an $NH_3$ emission determined in a measurement-technical manner on the output side of the SCR catalytic converter 5 exceeds a corresponding estimated value determined by the computer model by a presettable amount, this shows a model dosing rate D wrongly calculated too high by the computer model. In this case, the model dosing rate D is preferably corrected by multiplication with a long term adaption factor in such a manner that a target dosing rate reduced with regard to the model dosing rate D is obtained, with which the dosing unit 27 is accessed for outputting the reducing agent. If however a value for a NOx emission determined in a measurement-technical manner exceeds a corresponding estimated value determined by the computer model by a presettable amount, this shows a model dosing rate D which is wrongly calculated too low. In this case, the model dosing rate D is preferably corrected in such a manner by multiplication with the long term adaption factor that a target dosing rate is obtained that is increased with regard to the model dosing rate D, with which the dosing unit 27 is accessed for outputting the reducing agent. It is thereby preferably provided to provide a multiplication of the model dosing rate D with the long term adaption factor from the outset and to reduce or to increase the long term adaption factor by a presettable step width in the case of a necessary correction. With a first operation of the exhaust gas cleaning system, the long term adaption factor is preferably preallocated with the value 1.0.

According to the invention, when a value determined in a measurement-technical manner for a NOx emission falls below a corresponding estimated value determined by the computer model by a presettable amount, a correction of the $NH_3$ filling level value F determined by the computer model is performed on the output side of the SCR catalytic converter 5. A multiplication of the $NH_3$ filling level value F with a short term adaption factor is provided in such a manner that an assumed $NH_3$ actual filling level increased is compared to the $NH_3$ filling level F, with which the further calculations of the computer model are carried out. The measure of the increase or the amount of the short term adaption factor is can be fixed in dependence on the measure of the determined deviation.

For determining deviations of the emission values determined in a measurement-technical manner by the values determined by the computer model, integrations over successive integration cycles of a presettable length are continuously performed and the obtained summed values are compared. A quantitative adaption characteristic value is determined from the summed values, which is cyclically evaluated for the fulfilling of a presettable short term and/or long term adaption criterion. This procedure is explained in more detail in the following for when an exhaust gas sensor 25 is sensitive to NOx and also to $NH_3$. Using an exhaust gas sensor 25 formed in such a manner, a sensor can be saved, whereby however particular attention has to be paid to the right interpretation of the sensor signal. Wrong interpretations are avoided using procedure explained below.

FIG. 6 is initially referred to for explaining the procedure for determining the adaption characteristic value used for carrying out a long term or short term adaption. FIG. 6 illustrates example represented courses of integrated emission values in an exemplary manner in three successive integration cycles. A trace characterized with the parameter 60 reproduces the integrated course of the NOx amount flowing into the SCR catalytic converter 5. The trace 61 corresponds to an outflowing NOx amount determined with an exhaust gas sensor 25 that is sensitive to $NH_3$ and NOx in a measurement-technical manner. The trace 62 reflects the corresponding outflowing NOx amount calculated or estimated by the computer model.

The length of a respective integration cycle can be determined by a presettable fixed time span. The length of an integration cycle is presently, however, connected to the achieving of a presettable summing value $\Sigma$ for the integrated NOx amount flowing into the SCR catalytic converter 5 according to trace 60, called NOx raw emission value $NOx_{in}$ in the following. Depending on the type of the diesel engine 1, the summing value $\Sigma$ is given in a preferred region f 0.1 g NOx to 1.0 g NOx, calculated as NO. The integral NOx emission value for the measured NOx on the output side of the SCR catalytic converter 5 (trace 61) is called NOx pure emission measuring value $NOx_{outmes}$ in the following. Analogously, the integral value (trace 62) calculated by the computer model at the integration cycle end is called estimated NOx raw emission value $NOx_{outcalc}$.

The adaption characteristics value K decisive for carrying out a long term and/or short term adaption is determined by the relation:

$$K=(NOx_{outmes}-NOx_{outcalc}): NOx_{in}$$

where the colon ":" is used to signify that the calculation for K is related to $NOx_{in}$. For a further evaluation an average value for the adaption characteristic value K for several successive integration cycles is determined. An improved statistic safety is achieved thereby.

For evaluating the adaption characteristic value K with regard to the presence of the long term or short term adaption criterion used for carrying out a long term or short term adaption, it is checked if the adaption characteristic value K lies above a presettable upper threshold or below a presettable lower threshold. If the adaption characteristic lies within a region between the upper and the lower threshold, it is assumed that the computer model operates in a satisfactory manner, and the cyclic determination of adaption characteristic values is continued without carrying out an adaption.

If the adaption characteristic value K lies below the lower threshold of, for example −0.4, the raw emission measuring value $NOx_{outmes}$ is smaller by an impermissible amount than it was to be expected due to the modeling. It is assumed in this case that the actual $NH_3$ filling level of the SCR catalytic converter 5 has reached a critical height, or exceeds the $NH_3$ filling level value F determined by the computer model in an impermissible manner and the short term criterion is seen to be fulfilled. In this case a short term adaption is carried out in that the $NH_3$ filling level value F determined by the computer model is increased by multiplication with a short term adaption factor >1.0. The magnitude of the short term adaption factor is thereby preferably determined from a characteristic field of a characteristic line for a dependence on NOx conversion and $NH_3$ filling level analogously to the diagram shown in FIG. 4 in such a manner that the $NH_3$ filling level value F corrected to the assumed actual filling level goes with the NOx pure emission measuring value $NOx_{outmes}$. After expiration of a presettable blocking time, in which swinging processes can abate, the further cyclic determination or evaluation of adaption characteristic values K is performed. With the further calculation, the computer model for calculating the model dosing rate D assumes an actual corrected higher filling level which is assumed corresponding to the correction compared to the initially determined $NH_3$ filling level value F.

If more than a presettable number of short term adaptions become necessary during a presettable time span of, for example 5 min to 60 min, a continuous overdosing is assumed and a long term adaption preferably takes place in such a manner that the model dosing rate D determined by the computer model is multiplied with a long term adaption factor reduced by a presettable step width.

If the evaluation of the adaption characteristic value K results in that this lies above the upper threshold of about for example 0.1, a pure emission increased in an impermissible manner compared to the calculations of the computer model was measured by the exhaust gas sensor 25. The long term adaption criterion is considered to be fulfilled and a change of the long term adaption factor is provided. When using an exhaust gas sensor sensitive to NOx and $NH_3$, a decision procedure is first provided in direct succession to the determination of the adaption characteristic value K lying above the upper threshold value. It is decided in this if the signal delivered by the exhaust gas sensor 25 is to be viewed as being based on NOx or on $NH_3$. The decision procedure is explained in the following in more detail.

As a first step of the decision procedure, the dosing unit 27 for outputting a dosing pulse is accessed with a dosing rate of the reducing agent increased over the normal measure in the short term and pulse-like. The dosing pulse can be formed in the type of a DT1 member. The amplitude of the DT1 dosing pulse is chosen according to a $NH_3$ dosing rate in the region of 5 mg $NH_3$/s to 20 mg $NH_3$/s. An abatement time of the DT1 dosing pulse of 5 s to 60 s is chosen as the time constant. The start of the dosing pulse serves as the trigger for the start of an integration cycle for determining the NOx raw emission value $NOx_{in}$ of the NOx pure emission measuring value $NOx_{outmes}$ and of the NOx pure emission estimated value $NOx_{outcalc}$, with subsequent calculation of the adaption characteristic value K corresponding to the previous explanations. It is preferred thereby to reduce the summing value Σ determining the duration of the integration cycle compared to the normal adjustment, so that the adaption characteristic value is available in a faster manner.

If a reduced adaption characteristic value K now lying below the upper threshold is now determined due to the dosing rate increased in the short term and like a pulse, this indicates an underdosing present in front of the decision procedure and the measuring value 25 delivered by the exhaust gas sensor 25 or the NOx pure emission measuring value $NOx_{outmes}$ is interpreted as actually being based on $NH_3$. As a reaction to this decision, the long term adaption factor, with which the model dosing rate D is multiplied, is increased by a presettable step width and the dosing unit 27 is accessed for the dispensing of the model dosing rate D corrected corresponding to the target dosing rate. Subsequently, the continuous determination of adaption characteristic values K is taken up again, preferably after a presettable blocking time.

If a further increased adaption characteristic value K lying above the upper threshold is now determined subsequently to the dosing rate increased in the short term and like a pulse, this indicates an overdosing present in front of the decision procedure and the measuring value 25 delivered by the exhaust gas sensor 25 or the NOx pure emission measuring value $NOx_{outmes}$ is interpreted as being based on $NH_3$. As a reaction to this decision, the long term adaption factor, with which the model dosing rate D is multiplied, is reduced by a presettable step width and the dosing unit 27 is accessed for the dispensing of the model dosing rate D corrected corresponding to the target dosing rate. Subsequently, the continuous determination of adaption characteristic values is taken up again, after a predetermined blocking time. It is additionally provided, particularly even before the reduction of the long term adaption factor, to reduce an exhaust gas return rate for a short presettable time span or to set it to zero by closing the exhaust gas return valve. In this manner, the NOx raw emission of the diesel engine 1 is increased above the normal value in the short term, Thereby, $NH_3$ fed additionally to the SCR catalytic converter 5 and an increased $NH_3$ filling level are quickly degraded by the dosing pulse and a $NH_3$ slip that is undesirably high is prevented.

In particular with high temperatures of the SCR catalytic converter 5, the $NH_3$ filling capacity $Sp_{NH3}$ of the SCR catalytic converter 5 is low, as shown in the diagram of FIG. 3. This can lead to undesired inaccuracies with a model-based $NH_3$ filling level regulation adjusted to the $NH_3$ filling level. For solving this problem, it is provided according to the invention that, when undercutting a presettable threshold for the $NH_3$ filling capacity $Sp_{NH3}$, a model dosing rate D is determined by the computer model, with which a presettable target efficiency of the SCR catalytic converter 5 for the NOx conversion is achieved at least approximately. A target efficiency of about 80% of the maximum possible determined efficiency with the current conditions is preferably given. Thereby, a $NH_3$ slip is avoided in a reliable manner on the one hand, on the other hand it is achieved that the NOx conversion $U_{NOx}$ takes place solely or at least mainly with $NH_3$ directly fed to the SCR catalytic converter 5.

These adjustments ensure that the measuring value provided by the exhaust gas sensor 25 or the NOx pure emission measuring value $NOx_{outmes}$ in an integration cycle is actually based on NOx. If the evaluation of the adaption characteristic value K results in this case that it is above the upper threshold of, for example 0.1, the long term adaption criterion is viewed as to be fulfilled, as an impermissibly increased NOx pure emission measuring value $NOx_{outmes}$ compared to the calculations of the computer module was measured by the exhaust gas sensor 25, whereby a target dosing rate which is correspondingly adjusted too low can be concluded. An increase of the long term adaption factor K is performed as a reaction to this. The increase of the long term adaption factor K is thereby fixed in such a manner that, with a correspondingly corrected model dosing rate D in the previous integration cycle, an estimated NOx pure emission value $NOx_{outcalc}$ would have resulted, which would have resulted in an adaption characteristic value K of zero or approximately zero.

Altogether, it is thus ensured with the procedure according to the invention that an optimal dosing rate is achieved for the reducing agent and thus an optimal nitrogen oxide reduction in a very wide operating region of the exhaust gas treatment system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an exhaust gas treatment system, comprising an SCR catalytic converter for the treatment of an exhaust gas of a motor vehicle internal combustion engine, the method comprising:

adding, by a dosing unit controllable by a control unit, an ammonia-containing reducing agent to the exhaust gas;

feeding an exhaust gas enriched with ammonia according to the dosing to the SCR catalytic converter;

calculating, by a computer model, a model ammonia filling level value for an amount of ammonia stored in the SCR catalytic converter; and calculating, by the computer model, (a) a model dosing rate for the dosing of the reducing agent into the exhaust gas at which a target filling level of ammonia stored in the SCR catalytic converter specified by the computer model is at least approximately achieved based on the model ammonia filling level value, or (b) a target efficiency specified by the computer model for a nitrogen oxide conversion with ammonia stored in the SCR catalytic converter or fed to the SCR catalytic converter is at least approximately achieved, wherein the model dosing rate is corrected by applying a changeable long term adaption factor to a target dosing rate, thereby performing a long term adaption of the model dosing rate, wherein the model ammonia filling level value is corrected by applying a changeable short term adaption factor to the model ammonia filling level to produce a corrected model ammonia filling level, wherein the short term adaption factor is determined based on one or more characteristics associated with a relation between a NOx conversion of the SCR catalytic converter and the model ammonia filling level, and wherein during a duration for which the short term adaption factor is applied to the model ammonia filling level value the corrected model ammonia filling level is used as an assumed actual filling level of ammonia in the SCR catalytic converter, wherein the dosing unit is accessed for emitting the target dosing rate, wherein integrations in successive integration cycles of a presettable length respectively determine a nitrogen oxide raw emission value, a nitrogen oxide pure emission estimated value and a nitrogen oxide pure emission measuring value, and further an adaption characteristic value is determined based on a ratio of (a) a difference of the nitrogen oxide pure emission measuring value and the nitrogen oxide pure emission estimated value to (b) the nitrogen oxide raw emission value, and wherein the adaption characteristic value is used for assessment of a necessity for performing a long term or short term adaption.

2. The method according to claim 1, wherein nitrogen oxide or ammonia emission values of the exhaust gas are continuously determined and the nitrogen oxide or the ammonia emission values are evaluated in a cyclical manner with regard to fulfilling of a predetermined short term adaption criterion or of a long term adaption criterion.

3. The method according to claim 1, wherein the nitrogen oxide raw emission value is determined by the integration of a nitrogen oxide content in the exhaust gas on the input side of the SCR catalytic converter, the nitrogen oxide pure emission estimated value is determined by the integration of a nitrogen oxide content in the exhaust gas on the input side of the SCR catalytic converter calculated by the computer model, and the nitrogen oxide pure emission measuring value is determined by the integration of a nitrogen oxide content in the exhaust gas on the output side of the SCR catalytic converter derived from a signal of a nitrogen oxide sensor arranged on the output side of the SCR catalytic converter.

4. The method according to claim 2, wherein the long term adaption criterion is fulfilled when the adaption characteristic value exceeds a presettable upper threshold.

5. The method according to claim 2, wherein the short term adaption criterion is fulfilled when the adaption characteristic value is below a presettable lower threshold.

6. The method according to claim 1, wherein the long term adaption factor is changed by a presettable amount with a fulfilled long term adaption criterion and the short term adaption factor is changed by a presettable amount with a fulfilled short term adaption criterion.

7. The method according to claim 1, wherein a value for an ammonia emission on the output side of the SCR catalytic converter is determined in a measurement-technical manner and when this value exceeds a corresponding estimated value determined by the computer model by a presettable amount, a correction of the model dosing rate reducing the current dosing rate is performed by the long term adaption factor.

8. The method according to claim 1, wherein a value for a nitrogen oxide emission on the output side of the SCR catalytic converter is determined in a measurement-technical manner and when this value exceeds a corresponding estimated value determined by the computer model by a presettable amount, a correction of the model dosing rate increasing the current dosing rate is performed by the long term adaption factor.

9. The method according to claim 1, wherein a value for a nitrogen oxide emission on the output side of the SCR catalytic converter is determined in a measurement-technical manner and when this value is below a corresponding estimated value determined by the computer model by a predetermined amount, a correction increasing the model ammonia filling level value calculated by the computer model is performed by the short term adaption factor.

10. The method according to claim 1, wherein a current filling capacity for an amount of ammonia that can currently maximally be stored in the SCR catalytic converter and a currently possible maximum efficiency for the NOx conversion of the SCR catalytic converter are determined, and a presettable fraction of the currently possible maximum efficiency is used as the target efficiency when the current filling capacity is below a presettable threshold.

11. The method according to claim 10, wherein the long term adaption factor is configured in such a manner that the nitrogen oxide pure emission estimated value resulting therefrom results in an adaption characteristic value of zero or approximately zero in the previous integration cycle.

12. The method according to claim 1, wherein a direct conversion of ammonia with oxygen is considered with the calculation of the model ammonia filling level value.

13. The method according to claim 1, wherein a model-based ammonia filling level regulation is carried out for the at least approximate achievement of the target filling level of ammonia stored in the SCR catalytic converter.

14. A method for operating an exhaust gas treatment system, comprising an SCR catalytic converter for the treatment of an exhaust gas of a motor vehicle internal combustion engine, the method comprising:

calculating, by a computer model, an ammonia filling level value for an amount of ammonia stored in the SCR catalytic converter;

calculating, by the computer model, a model dosing rate for dosing of a reducing agent into the exhaust gas at which a target filling level of ammonia stored in the SCR catalytic converter specified by the computer model, or a target efficiency specified by the computer model for a nitrogen oxide conversion with ammonia stored in the SCR catalytic converter or fed to the SCR catalytic converter are at least approximately achieved;

adding, by a dosing unit controllable by a control unit, an ammonia-containing reducing agent to the exhaust gas according to the calculated model dosing rate;

feeding an exhaust gas enriched with ammonia according to the dosing to the SCR catalytic converter;

determining, by integrating in successive integration cycles of a presettable length, (1) a nitrogen oxide raw emission value representing nitrogen oxide flowing into the SCR catalytic converter, (2) a nitrogen oxide pure emission estimated value representing an estimate of nitrogen oxide leaving the SCR catalytic converter and which is calculated using a computer model and accounts for the nitrogen oxide flowing into the SCR catalytic converter, and (3) a nitrogen oxide pure emission measuring value representing a measured value of the nitrogen oxide leaving the SCR catalytic converter;

determining an adaption characteristic value based on a ratio of (a) a difference of the nitrogen oxide pure emission measuring value and the nitrogen oxide pure emission estimated value to (b) the nitrogen oxide raw emission value;

adjusting the model dosing rate and adding the ammonia-containing reducing agent to the exhaust gas according to the adjusted model dosing rate, wherein when the nitrogen oxide pure emission measuring value is greater than the nitrogen oxide pure emission estimated value, the model dosing rate is adjusted by a long term adaption factor to result in a dosing rate that is increased with regard to the calculated model dosing rate, wherein when the nitrogen oxide pure emission measuring value is less than the nitrogen oxide pure emission estimated value the ammonia filling level is adjusted by a short term adaption factor to result in an ammonia filling level for an amount of ammonia stored in the SCR catalytic converter that is increased compared to the calculated ammonia filling level for an amount of ammonia stored in the SCR catalytic converter, wherein the short term adaption factor is determined based on one or more characteristics associated with a relation between a NOx conversion of the SCR catalytic converter and the model ammonia filling level, and wherein the long term and short term adaption factors are based on the determined adaption characteristic value.

15. The method of claim 14, wherein the model dosing rate is adjusted by a long term adaption factor that reduces the dosing rate compared to the calculated dosing rate when an amount of measured ammonia exiting the SCR catalytic converter is greater than an estimated amount of ammonia exiting the SCR catalytic converter based on a model.

16. The method of claim 14, wherein nitrogen oxide or ammonia emission values of the exhaust gas are continuously determined and the nitrogen oxide or the ammonia emission values are evaluated in a cyclical manner with regard to fulfilling of a predetermined short term adaption criterion or of a long term adaption criterion.

17. The method of claim 14, wherein a current filling capacity for an amount of ammonia that can currently maximally be stored in the SCR catalytic converter and a currently possible maximum efficiency for a NOx conversion of the SCR catalytic converter are determined, and a presettable fraction of the currently possible maximum efficiency is used as the target efficiency when below a presettable threshold for the current filling capacity.

18. The method of claim 17, wherein the long term adaption factor is configured in such a manner that the nitrogen oxide pure emission estimated value resulting therefrom results in an adaption characteristic value of zero or approximately zero in the previous integration cycle.

19. The method of claim 14, wherein a direct conversion of ammonia with oxygen is considered with the calculation of the ammonia filling level value.

* * * * *